United States Patent [19]

Iijima

[11] Patent Number: 5,093,785

[45] Date of Patent: Mar. 3, 1992

[54] PORTABLE ELECTRONIC DEVICE WITH MEMORY HAVING DATA POINTERS AND CIRCUITRY FOR DETERMINING WHETHER A NEXT UNWRITTEN MEMORY LOCATION EXIST

[75] Inventor: Yasuo Iijima, Yokohama, Japan

[73] Assignee: Kabushiki Kaisha Toshiba, Kawasaki, Japan

[21] Appl. No.: 323,196

[22] Filed: Mar. 13, 1989

Related U.S. Application Data

[63] Continuation of Ser. No. 934,848, Nov. 25, 1986, abandoned.

[30] Foreign Application Priority Data

Nov. 30, 1985 [JP] Japan .................. 60-269629
Sep. 4, 1986 [JP] Japan .................. 61-208252

[51] Int. Cl.⁵ .................. G06F 7/02; G06K 19/06
[52] U.S. Cl. .................. 395/400; 364/231.2; 364/237.82; 364/246; 364/247.7; 364/DIG. 1; 235/492
[58] Field of Search ... 364/200 MS File, 900 MS File; 235/379, 380, 381, 375, 487, 492

[56] References Cited

U.S. PATENT DOCUMENTS

| | | | |
|---|---|---|---|
| 3,900,834 | 8/1975 | Casey et al. | 364/200 |
| 4,211,919 | 7/1980 | Ugon | 235/487 |
| 4,295,041 | 10/1981 | Ugon | 235/487 |
| 4,348,740 | 9/1982 | White | 364/900 |
| 4,453,074 | 6/1984 | Weinstein | 235/380 |
| 4,544,833 | 10/1985 | Ugon | 235/379 |
| 4,575,621 | 3/1986 | Oreifus | 235/380 |
| 4,634,845 | 1/1987 | Hale et al. | 235/350 |
| 4,650,975 | 3/1987 | Kitchener | 235/380 |
| 4,683,372 | 7/1987 | Matsumoto | 235/492 |
| 4,712,177 | 12/1987 | Schrenk | 235/380 |
| 4,734,568 | 3/1988 | Watanabe | 235/487 |
| 4,736,094 | 4/1988 | Yoshida | 235/380 |
| 4,742,215 | 5/1988 | Daughters et al. | 235/487 |
| 4,746,787 | 5/1988 | Suto et al. | 235/380 |
| 4,749,982 | 6/1988 | Rikuna et al. | 235/380 |
| 4,829,169 | 5/1989 | Watanabe | 235/380 X |

OTHER PUBLICATIONS

German periodical, "ntz", vol. 37, Issue 3, 1984, pp. 175-176.

Primary Examiner—Thomas C. Lee
Assistant Examiner—L. Donaghoe
Attorney, Agent, or Firm—Cushman, Darby & Cushman

[57] ABSTRACT

A portable electronic device in which when data is written in a PROM the start address of the next unwritten area is stored in a RAM incorporated in a CPU of the portable electronic device. A data memory is divided into a plurality of areas, and each area is further divided into a plurality of blocks. The data length of each block is determined for each area, and input data is divided in accordance with the data length as a processing unit for storage. After the final block of data is stored, a CPU stores the address position of the final data of the final block at the beginning of the corresponding area.

2 Claims, 20 Drawing Sheets

| WRITE INSTRUCTION FUNCTION CODE | STORAGE DATA |

| UNWRITTEN AREA CERTIFYING FUNCTION CODE |

AREA 00

| AREA NUMBER (62) | THE NUMBER OF BYTES (64) | START ADDRESS (66) | FINAL ADDRESS (68) |
|---|---|---|---|
| 01 | 5 | aaa | bbb |
| 02 | 4 | ccc | ddd |
| 03 | 4 | eee | fff |
| ～ | ～ | ～ | ～ |
| FE | 5 | ggg | hhh |
| FF | 3 | iii | jjj |

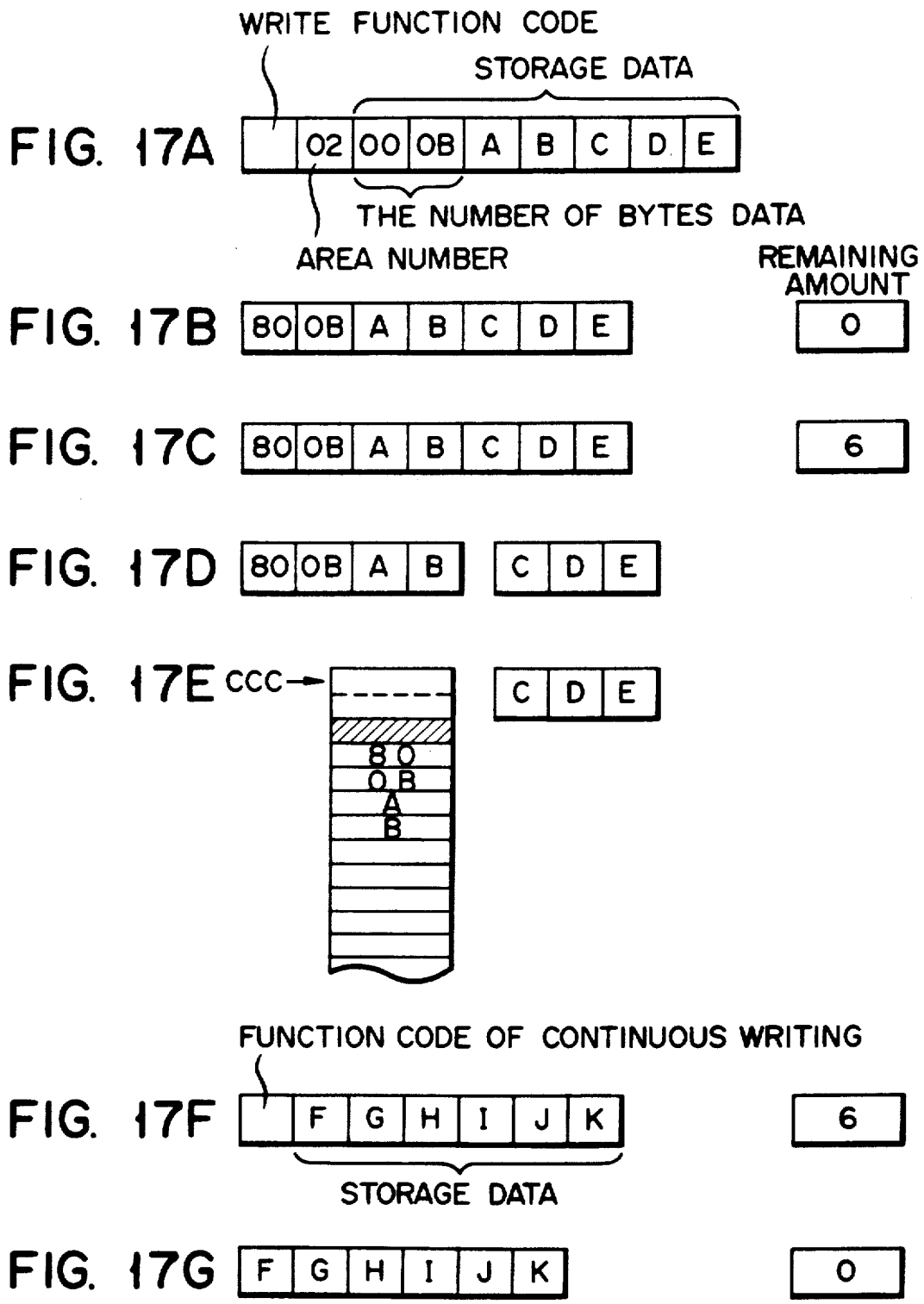

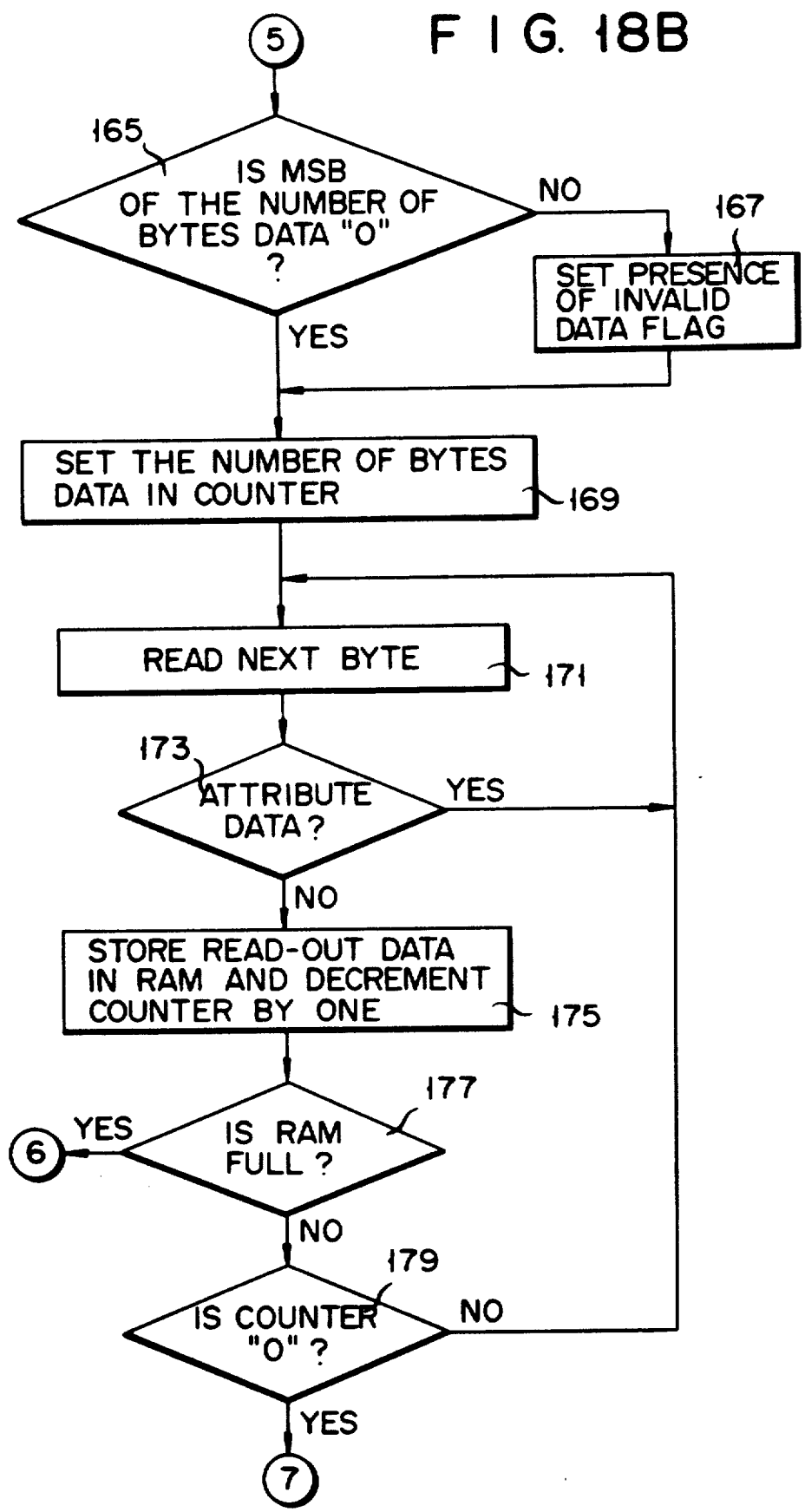

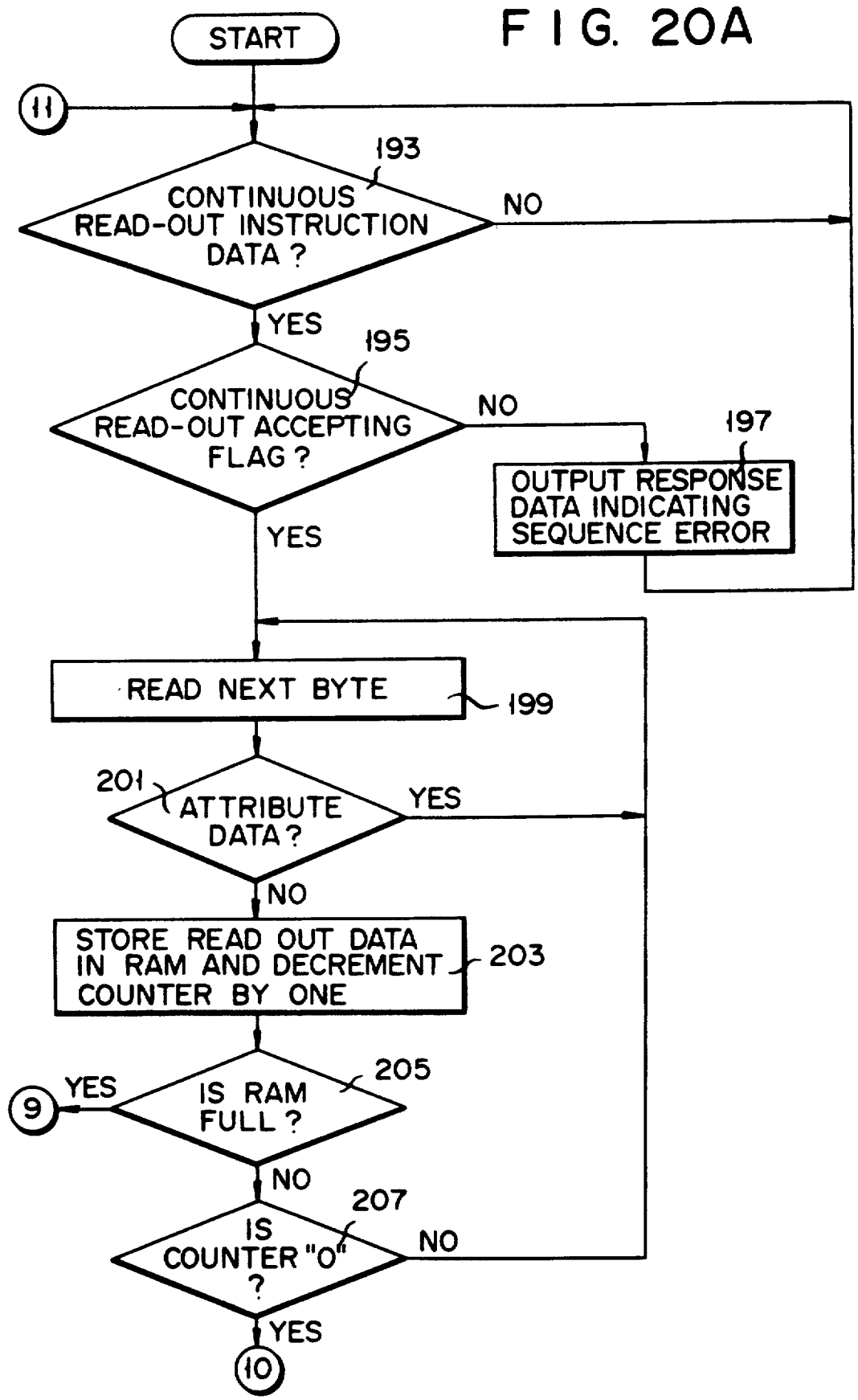

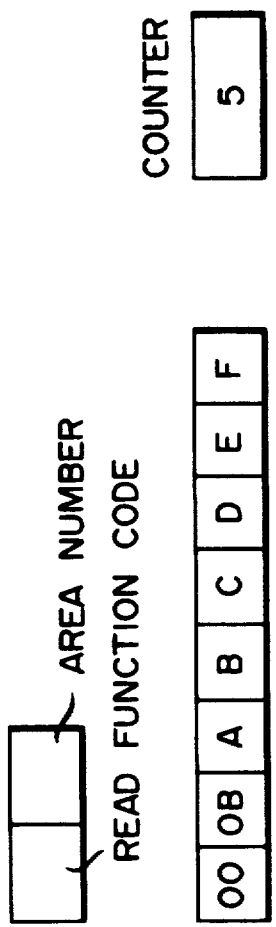
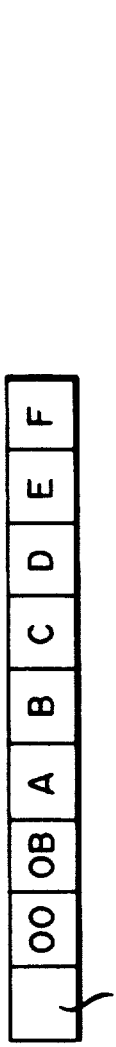
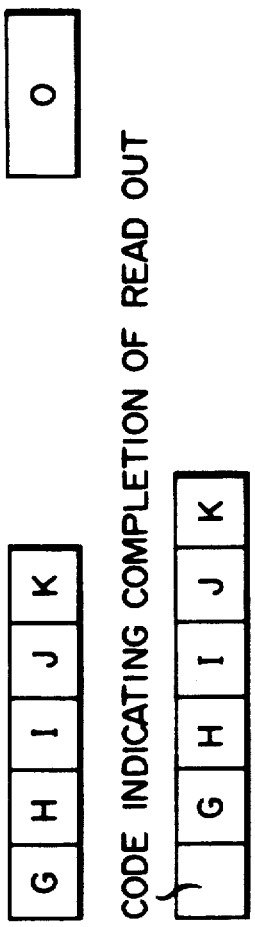
FIG. 21A  FIG. 21B  FIG. 21C  FIG. 21D  FIG. 21E  FIG. 21F

PORTABLE ELECTRONIC DEVICE WITH MEMORY HAVING DATA POINTERS AND CIRCUITRY FOR DETERMINING WHETHER A NEXT UNWRITTEN MEMORY LOCATION EXIST

This is a continuation of application Ser. No. 06/934,848, filed Nov. 25, 1986, which was abandoned upon the filing hereof.

BACKGROUND OF THE INVENTION

The present invention relates to a portable electronic device, a so-called IC card, which incorporates an IC (integrated circuit) chip having a nonvolatile data memory and a control element, e.g., a CPU (Central Processing Unit).

In recent years, an IC card incorporating an IC chip having a nonvolatile memory (e.g., PROM) and a CPU has been developed as a memory card for storing data and is commercially available. In a system using an IC card of this type, data exchange with the IC card is made by a card reader/writer. When the IC card receives instruction data with a function code from the card reader/writer, it executes a function and outputs the execution result to the card reader/writer as response data.

When a data string input to the IC card is written in the data memory, the input data may be written only after an unwritten area in which no valid data is written is first certified. In this case, when a plurality of data strings are successively written, if address data of the next area (for example, a start address of unwritten area) in which data is to be written is not stored, an unwritten area must first be certified each time the data string is written, resulting in a long total write time.

In a conventional IC card, when a data string is written in a target area, it is written from a given reference address (e.g., a start address) in a single direction, and a final address of the written data string is stored in a RAM (Random Access Memory) in a control element, thus simplifying the subsequent write operation. More specifically, when a power supply of the IC card is turned on, the above simplification can be realized. However, after the power supply is temporarily turned off and is turned on again to perform a write operation, the content of the RAM is erased. Therefore, the final address must be searched from the target area. In this case, a specific value, e.g., "FF$_H$", must be held as data for certifying unwritten data. For this reason, data write speed is considerably decreased.

SUMMARY OF THE INVENTION

It is an object of the present invention to provide a portable electronic device which can continuously perform a data write operation in a data memory without sequentially certifying unwritten areas, and can improve the write speed and shorten the write time.

It is another object of the present invention to provide a portable electronic device which can greatly improve a data access speed and requires no data for certifying unwritten data.

In order to achieve the above object, there is provided a portable electronic device comprising:

a memory for storing data; and a central processing unit (CPU) for selectively controlling data read access or data write access from or in the memory in response to an instruction supplied from a host system connected to the portable electronic device, the CPU storing data which can provide a storage address of the next unwritten area in a predetermined area of the memory when the CPU writes data in the memory.

BRIEF DESCRIPTION OF THE DRAWINGS

Other objects and features of the present invention will be apparent from the following description taken in connection with the accompanying drawings, in which:

FIGS. 17A through 17J are diagrams for explaining the data write operation in detail;

FIGS. 18A through 18C are flow charts for explaining a data read operation;

FIGS. 20A and 20B are flow charts for explaining a continuation read operation;

FIGS. 21A through 21F are diagrams for explaining the data read operation in detail;

DETAILED DESCRIPTION OF THE PREFERRED EMBODIMENTS

Figure 1:
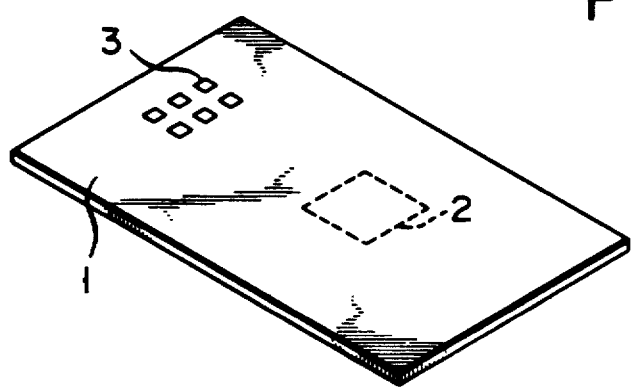
FIG. 1 is a perspective view of the outer appearance of an IC card according to an embodiment of the present invention.
Figure 2:
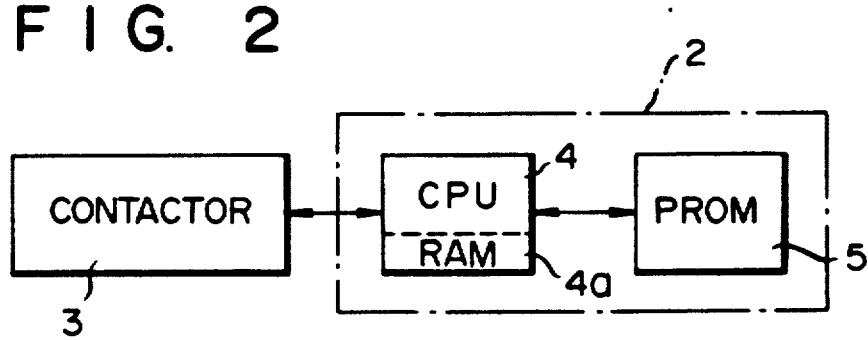
FIG. 2 is a block diagram showing the arrangement of an IC chip incorporated in the IC card.

FIG. 1 shows IC card 1 as a portable electronic device according to the present invention. IC card 1 incorporates IC chip 2, which is electrically connected to contactor 3 consisting of a plurality of contacts formed on the surface of IC card 1. As shown in FIG. 2, IC chip 2 comprises CPU 4 as a control element for decrypting, operating and storing input instruction and a data, and PROM (Programmable Read-Only Memory) 5, as a nonvolatile data memory, which is subjected to data read/write operation under the control of CPU 4. Note that CPU 4 incorporates RAM 4a.

Figure 3:
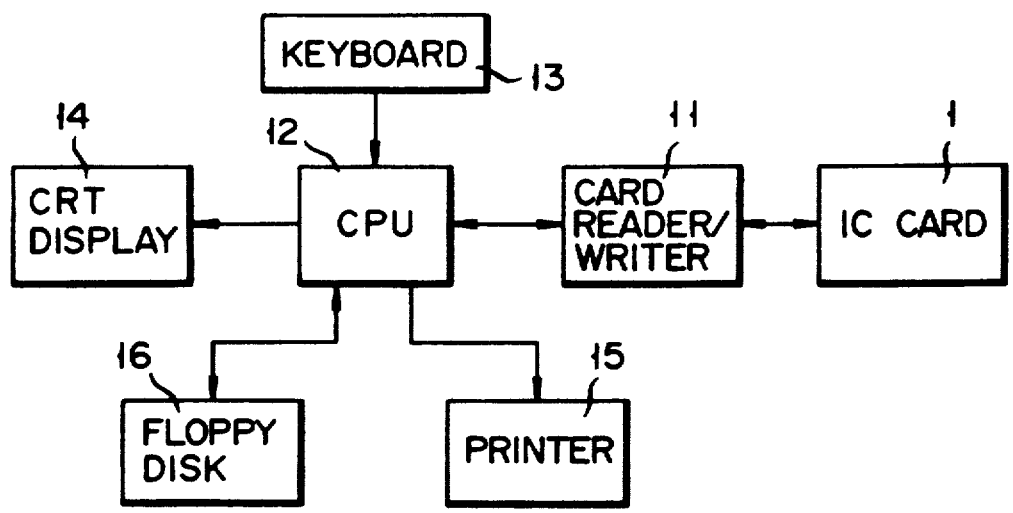
FIG. 3 is a block diagram showing the arrangement of a card manipulator.

FIG. 3 shows the arrangement of a card manipulator used as a terminal device of, e.g., a home banking system or home shopping system, to which IC card 1 is applied as a portable electronic device according to the present invention. The manipulator allows IC card 1 to be connected to controller (i.e., CPU) 12 through card reader/writer 11. CPU 12 is connected to keyboard 13, CRT display 14, printer 15, and floppy disk unit 16.

IC card 1 decrypts instruction data input from card reader/writer 11 and executes necessary processing. In order to realize this, IC card 1 comprises CPU 4 and PROM 5, as described above. Card reader/writer 11 performs communication of data, e.g., instruction data and response data, between IC card 1 and CPU 12.

Figure 4:
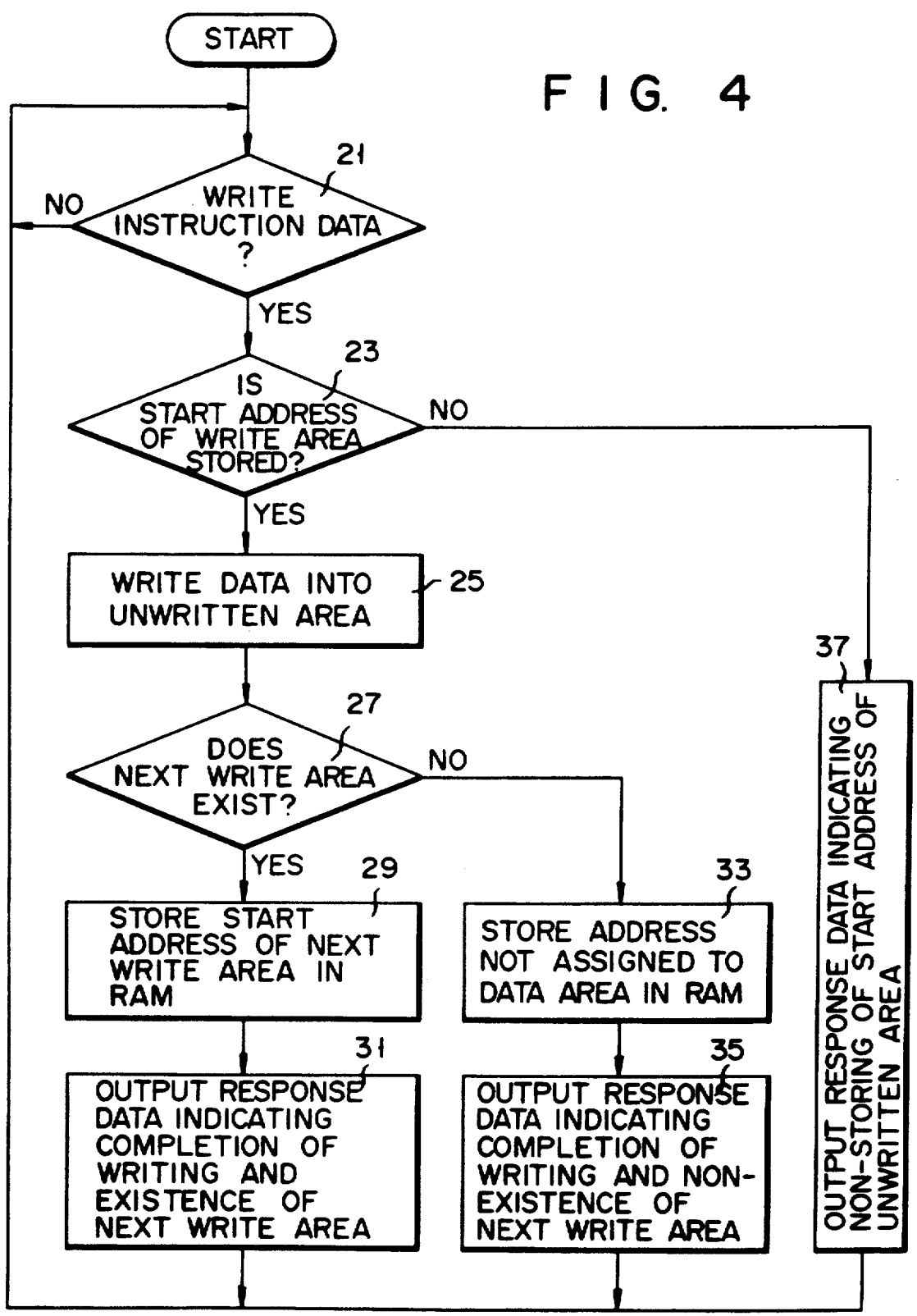
FIG. 4 is a flow chart for explaining a write operation of the IC card.

The operation of IC card 1 with the above arrangement will now be described. First, a write operation will be described with reference to the flow chart shown in FIG. 4.

Figures 5, 6, 7:
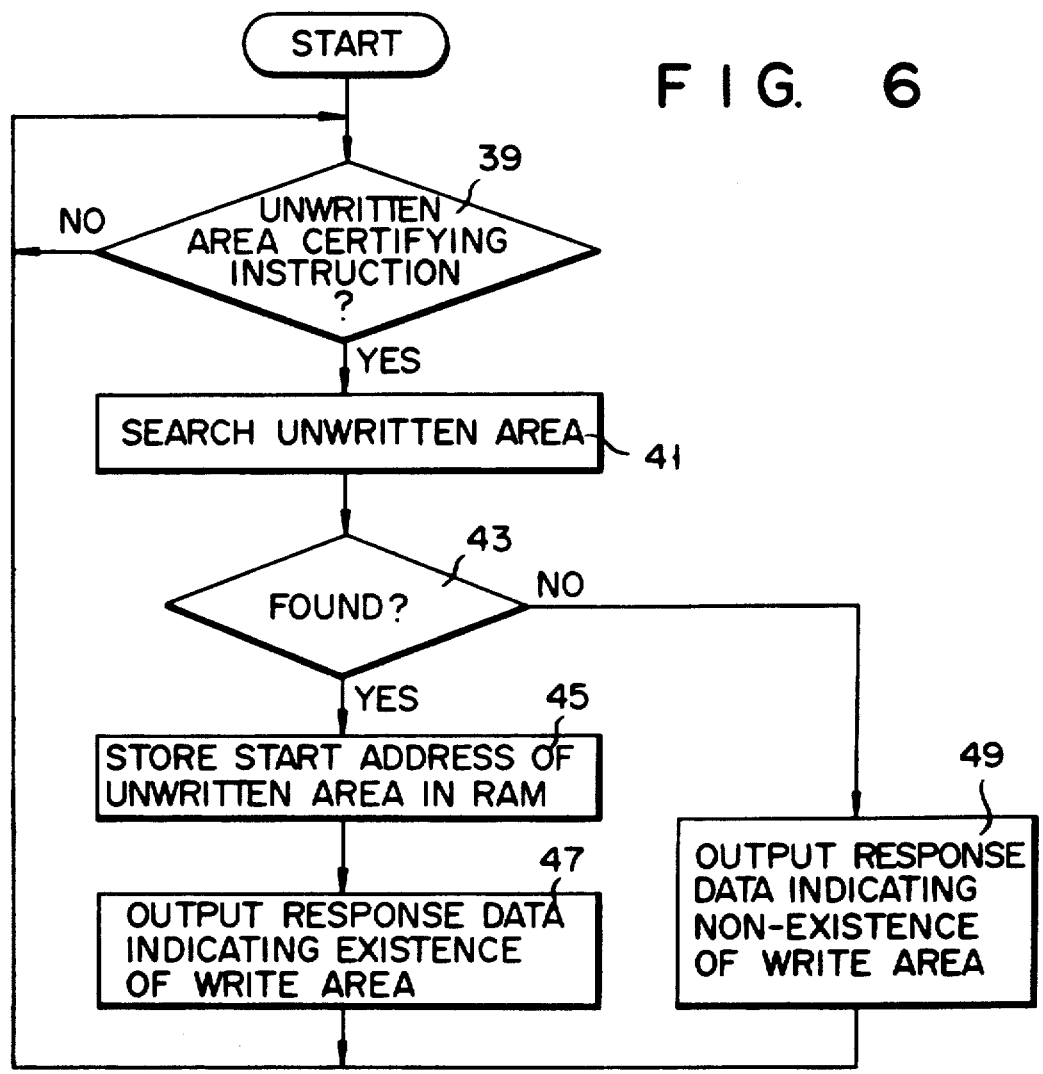
FIG. 5 is a format of write instruction data.
FIG. 6 is a flow chart for explaining an unwritten area certifying operation of the IC card.
FIG. 7 is a format of unwritten area certifying instruction data.
Figure 8:
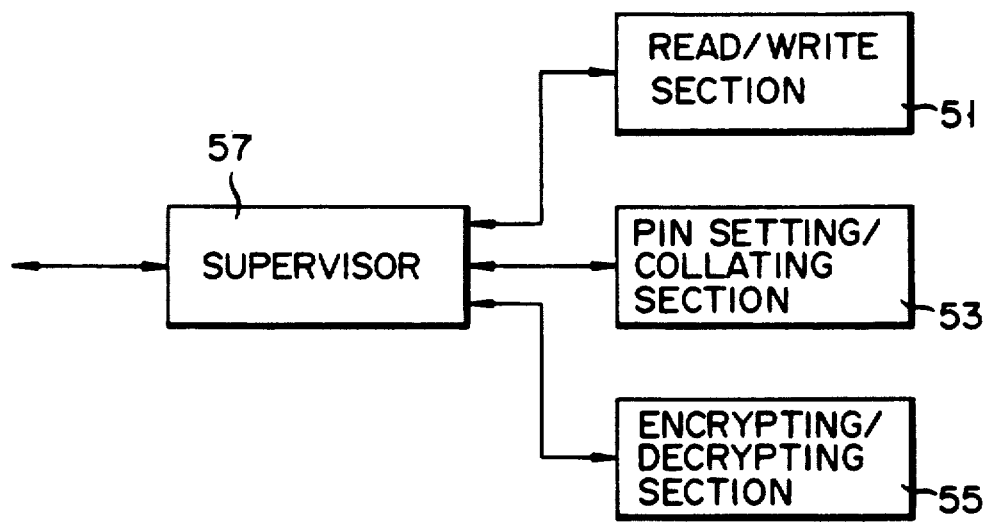
FIG. 8 is a function block diagram of an IC card according to another embodiment of the present invention.

IC card 1 awaits write instruction data from card reader/writer 11. The write instruction data consists of, e.g., a write instruction function code and storage data, as shown in FIG. 5. If it is judged in step 21 that the write instruction data from card reader/writer 11 is received, CPU 4 checks in step 23 if the start address of an unwritten area is stored in a predetermined area in its internal RAM 4a. If NO in step 23, CPU 4 outputs response data indicating the non-existence of the start address of the unwritten area in step 37, and the flow returns to step 21. However, if YES in step 23, CPU 4 writes the storage data in the instruction data in an area of PROM 5 indicated by the start address, and stores the start address of the unwritten area after the write operation in the predetermined area in RAM 4a to update it in step 25. If it is judged in step 27 that no unwritten area exists in PROM 5, CPU 4 stores an address not assigned to data areas in RAM 4a in step 33, and outputs response data indicating completion of writing and the non-existence of a next write address in step 35. The flow then returns to step 21. However, if it is judged in step 27 that the next write area exists in PROM 5, CPU 4 stores the start address of the next write area in the predetermined area of RAM 4a in step 29. In step 31, CPU 4 outputs response data indicating completion of writing and existence of the next write area, and the flow then returns to step 21.

An operation for certifying the start address of the unwritten area will be described with reference to the flow chart shown in FIG. 6. IC card 1 first awaits unwritten area certifying instruction data. The unwritten area certifying instruction data includes, e.g., an unwritten area certifying function code shown in FIG. 7. When it is judged in step 39 that the unwritten area certifying instruction data is received, CPU 4 searches the start address of an unwritten area in step 41. If NO in step 43, CPU 4 outputs response data indicating the non-existence of the unwritten area in step 49 and the flow returns to step 39. However, if YES in step 43, CPU 4 stores the start address in the predetermined area of RAM 4a in step 45, and outputs response data indicating the existence of the unwritten area in step 47. The flow then returns to step 39.

When data is written in IC card 1, after the unwritten area certifying instruction data is received, one or a plurality of write instruction data are received.

With the above arrangement, when data is written in the data memory, the start address of an immediately following unwritten area is always stored. Therefore, an unwritten area need not be searched each time data is written in the data memory, and the data write operation can be continuously performed, thus improving the write speed and shortening the write time. Before data is written in the data memory, an unwritten area is certified to store its start address, thus simplifying the subsequent data write sequence and shortening the write time.

Another embodiment of the present invention will now be described with reference to FIGS. 8 through 23.

An IC card according to another embodiment of the present invention comprises a section for executing basic functions, i.e., read/write section 51, PIN setting-/collating section 53, encrypting/decrypting section 55, and supervisor 57 for managing the basic functions. Read/write section 51 reads, writes, or erases data with card reader/writer 11. PIN setting/collating section 53 performs storage/readout inhibition processing of a PIN (personal identification number) set by a user, and collates a PIN after the PIN is set to provide permission for the subsequent processing. Encrypting/decrypting section 55 encrypts data or decrypts encrypted data so as to prevent communication data from being disclosed or counterfeited when data is transmitted from CPU 12 to another terminal device through a communication line. Section 55 performs data processing in accordance with an encryption algorithm, e.g., DES (Data Encryption Standard) having a sufficient encryption strength. Supervisor 57 decodes a function code with or without data input from card reader/writer 11 and selects a necessary function from the basic functions to execute it.

Figure 9:
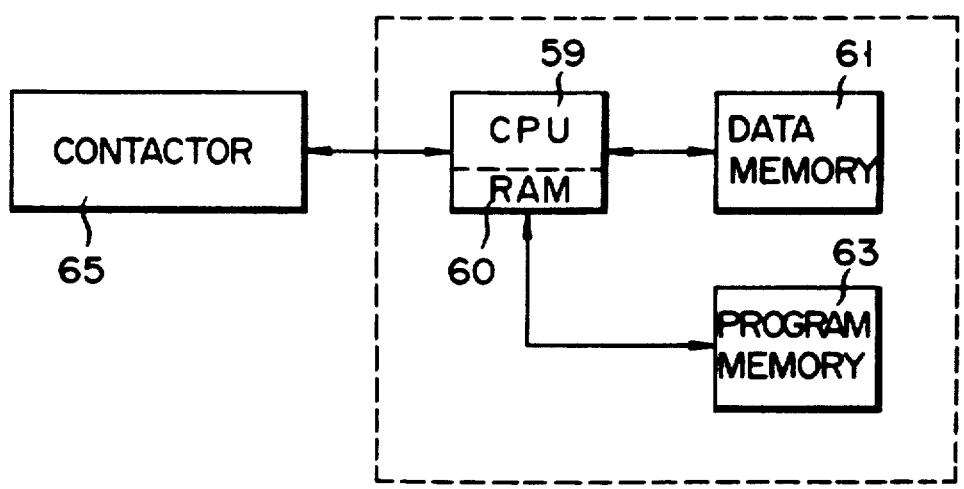
FIG. 9 is a block diagram showing the arrangement of an IC chip incorporated in the IC card shown in FIG. 8.

In order to effect these functions, IC card 1 comprises control element (e.g., CPU) 59 as a controller, nonvolatile data memory 61 whose storage content is erasable, program memory 63, and contactor 65 for obtaining electrical contact with card reader/writer 11, as shown in FIG. 9. Among these, the components enclosed in broken lines (CPU 59, data memory 61, and program memory 63) are constituted by a single IC chip. Note that CPU 59 incorporates RAM 60. Program memory 63 comprises a mask ROM, and stores a control program for CPU 59 having subroutines for realizing the above-mentioned basic functions. Data memory 61 comprises an EEPROM for storing various data.

Figure 10:
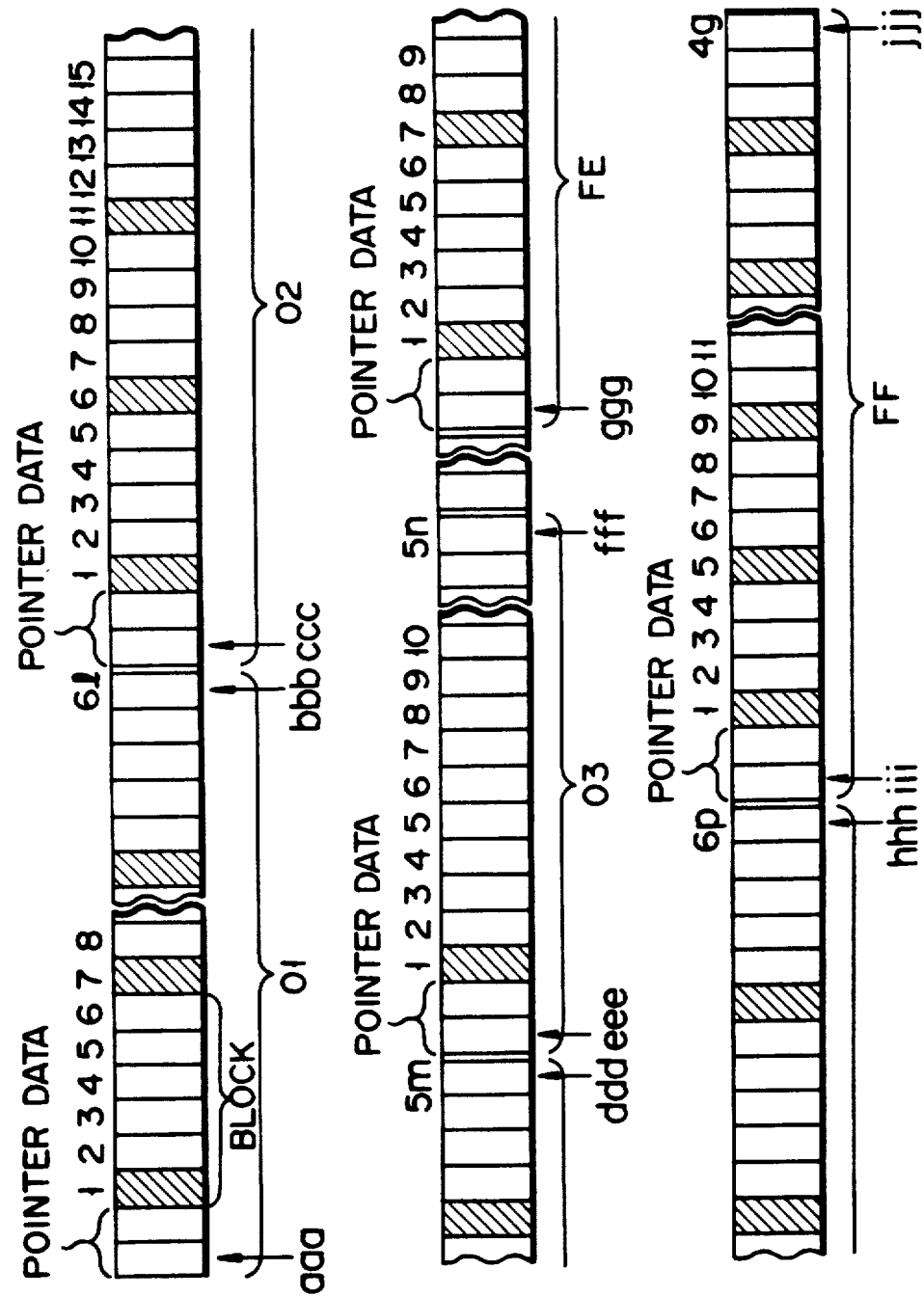
FIG. 10 is a memory map of a data memory divided into a plurality of blocks.
Figures 11, 12:
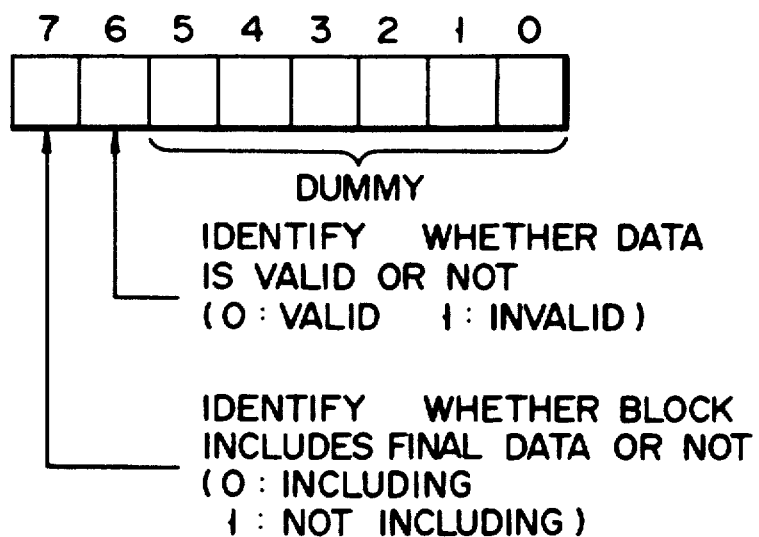
FIG. 11 is an example of an index table showing the relationship between area numbers, the numbers of bytes, start addresses, and final addresses of respective areas in the data memory.
FIG. 12 is a format of attribute data.

Data memory 61 is divided into a plurality of areas 01, 02, ..., FF, as shown in FIG. 10, and each area is divided into one or a plurality of blocks. Each block has a predetermined number of bytes, and processing is made in units of blocks. Each block consists of attribute data (one byte) and storage data. As shown in FIG. 10, area numbers [00] to [FF] are assigned to the respective areas (area 00 is not shown). In area [00], the number of bytes 64, start address 66 of each area, and final address 68 of each area are stored in correspondence with area number 62 (will be referred to as an index table hereinafter) as shown in FIG. 11. For example, the start address of area [01] is aaa and the final address thereof is bbb. Each block of area [01] has six bytes (attribute data has one byte and storage data has five bytes). At the beginning of each area, a region for storing the address of the final byte of the final block of written data (to be referred to as pointer data hereinafter) is provided. For example, in two bytes starting from address aaa of area [01] in FIG. 10, an address at which the final byte of the final block of data written therein is written. In FIG. 10, hatched portions indicate portions in which attribute data with respect to the corresponding block is stored. Attribute data includes an identifier indicating whether or not storage data is valid and an identifier indicating whether or not a block includes final data when a series of storage data strings are stored over a plurality of blocks.

FIG. 12 shows a format of the attribute data. As shown in FIG. 12, bit "6" is an identifier indicating whether or not storage data in a block is valid. If data "1" is set in bit "6", this indicates that the storage data is invalid, and if data "0" is set, this indicates that the data is valid. Bit "7" is an identifier indicating whether or not a block includes the final byte of a series of data. If data "1" is set in this bit, this indicates that the block does not include the final byte, and of data "0" is set, this indicates that the block includes the final byte. Note that bits "0" through "5" are dummy bits.

Figure 13A:
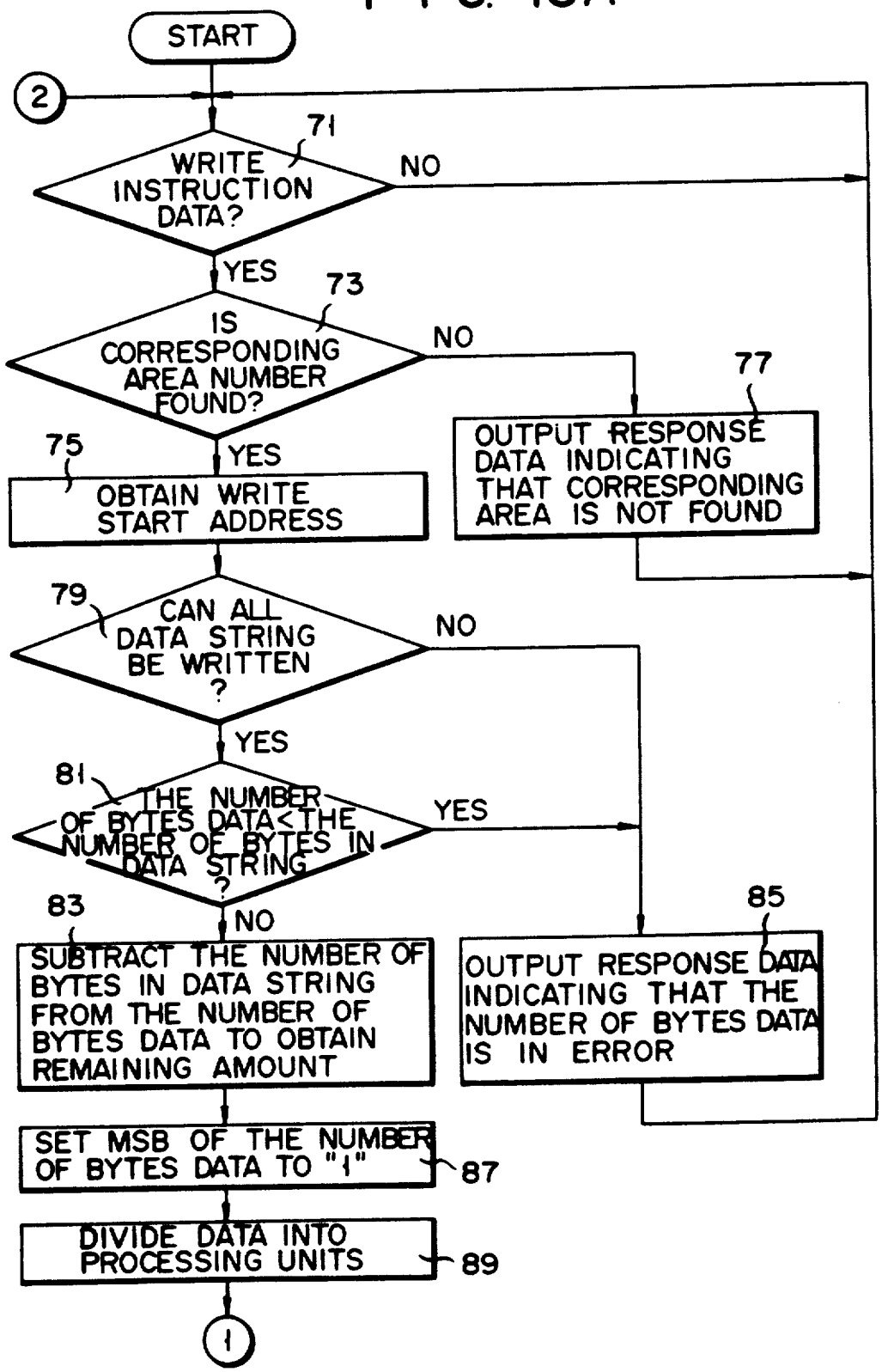
FIGS. 13A and 13B are flow charts for explaining a data write operation according to another embodiment of the present invention.
Figure 13B:
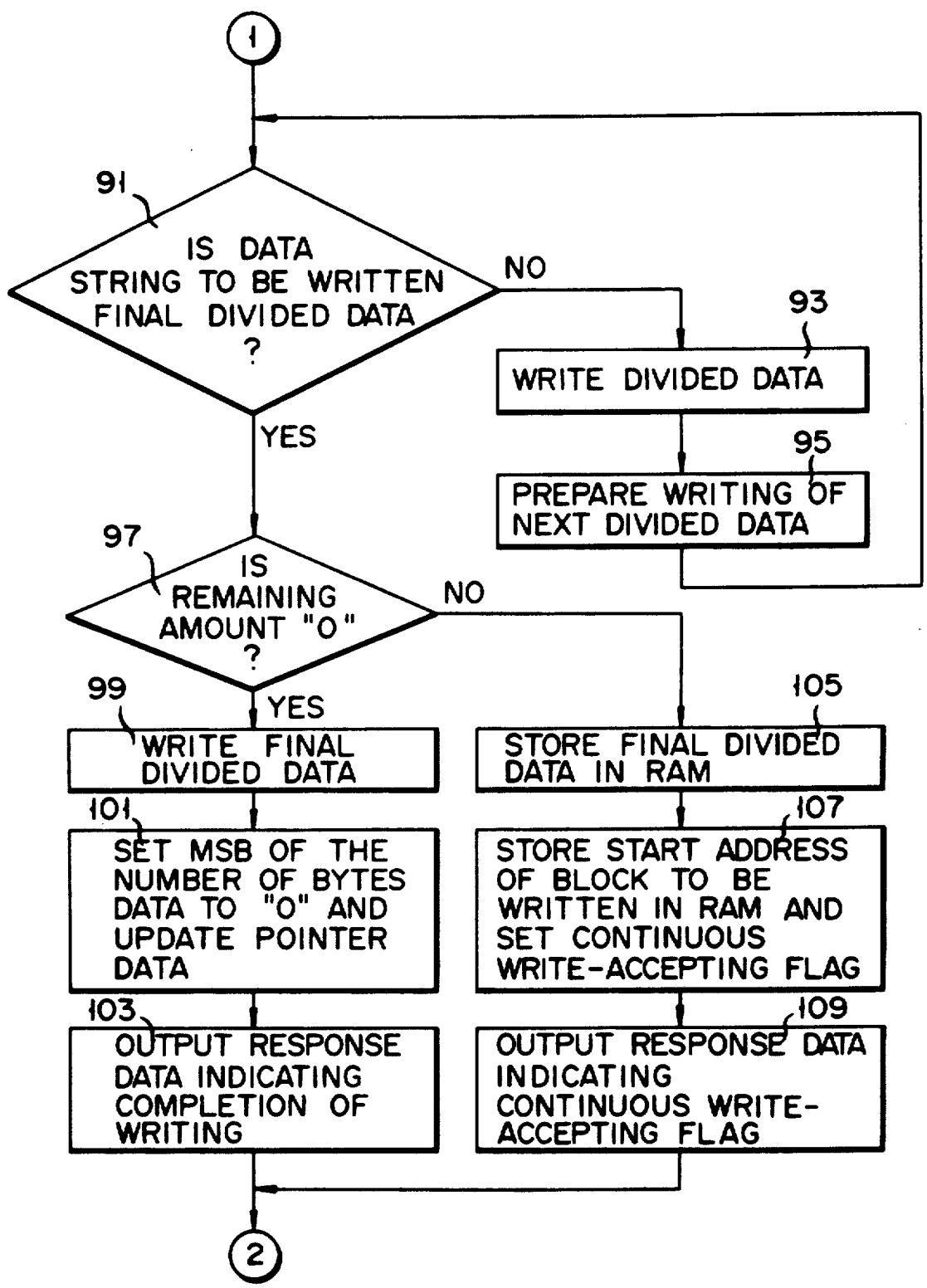
Figure 14:
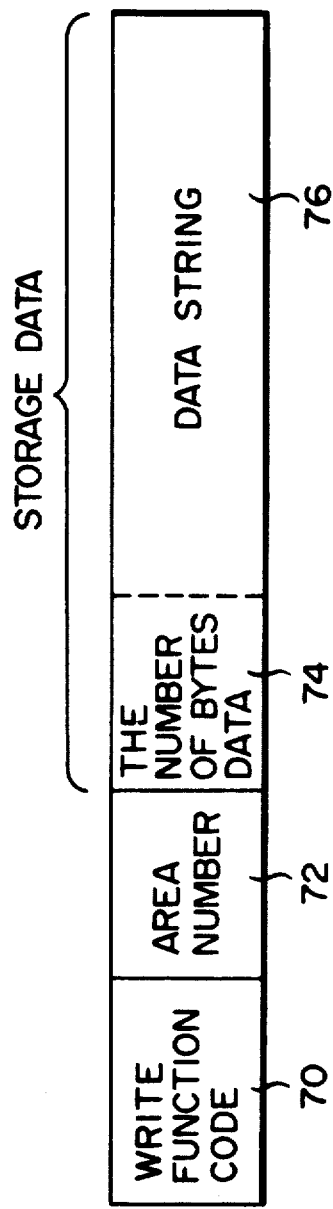
FIG. 14 is a format of write instruction data.

The data write operation in data memory 61 with the above arrangement will be described with reference to the flow charts shown in FIGS. 13A and 13B. When data is written in data memory 61, write instruction data having a format shown in FIG. 14 is input. The write instruction data consists of write function code 70, area number 72, and storage data. The storage data consists of data string 76 to be stored and the number of bytes data 74 constituting the data string. In a normal state, CPU 59 awaits instruction data from card reader/writer 11. When CPU 59 receives instruction data from reader/writer 11, it checks in step 71 if the function code included in the input instruction data is a write function code. If YES in step 71, CPU 59 searches the area number added to the instruction data from area [00] in step 73. If NO in step 73, CPU 59 outputs response data indicating that the corresponding area is not found in step 77, and then awaits the next instruction data. If YES in step 73, i.e., if the area number included in the instruction data is found in the index table, CPU 59 refers to the number of bytes written in the index table. When storage data is written in a designated area, CPU 59 first refers to pointer data at the beginning of the designated area to certify the write start address in step 75. That is, data is written from the address obtained by incrementing the pointer data by one. CPU 59 checks in step 79 if all the input storage data can be written in the entire area. This is performed by referring to the start and final addresses in the index table. If NO in step 79, CPU 59 outputs response data indicating that the number of bytes data in the instruction data is in error in step 85, and then awaits the next instruction data. However, if YES in step 79, CPU 59 compares the number of bytes data with the number of bytes constituting the data string in step 81. Normally, the number of bytes data included in the instruction data cannot be transmitted by a single transmission operation (between a host system and the IC card). For example, the number of bytes data may indicate 11 bytes and the number of bytes of storage data sent by one instruction data may be five bytes. If YES in step 81, i.e., if the number of bytes data is smaller than the number of bytes in the data string, CPU 59 outputs response data indicating that the number of bytes data is in error in step 85, and then awaits the next instruction data. Otherwise, CPU 59 subtracts the number of bytes in the data string from the number of bytes data to obtain a remaining amount, and stores the remaining amount in a specific area of data memory 61, in step 83.

In step 87, CPU 59 then sets the MSB (Most Significant Bit) of a bit string constituting the number bytes data in the data string to "1", thereby temporarily making the storage data invalid. CPU 59 divides the storage data into processing units in step 89, adds attribute data to each processing unit, and stores it in a designated data area (steps 91, 93, and 95). CPU 59 checks in step 91 if the data string to be written is final divided data. If YES in step 91 and if it is determined in step 97 that data "0" is set in the bit indicating the remaining amount, all the final data of the final block is stored. In addition, the MSB of the bit string constituting the number of bytes data of the data string is set to "0" to make the storage data valid, and the final address of the block including the final byte of the data string is stored as pointer data (steps 99 and 101). CPU 59 outputs response data indicating completion of writing in step 103, and then awaits the next instruction data. However, if it is determined in step 97 that the bit indicating the remaining amount is not "0", CPU 59 stores the final divided data of the data string included in the instruction data in internal RAM 60 without writing it in the designated area in step 105. Then, CPU 59 sets a writing continuation accepting flag in RAM 60 and the starting address of the next unwritten block in RAM 60 as a write start address in step 107. CPU 59 outputs response data indicating writing continuation acception in step 109, and then awaits the next instruction data.

Figure 16:
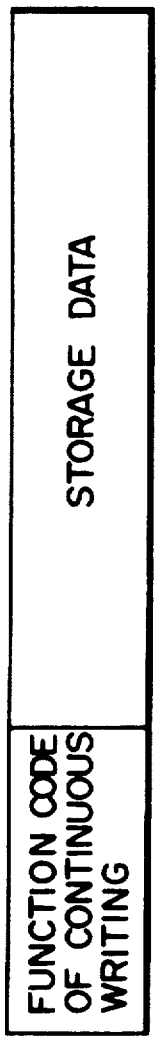
FIG. 16 is a format of continuation write instruction data.
Figure 15A:
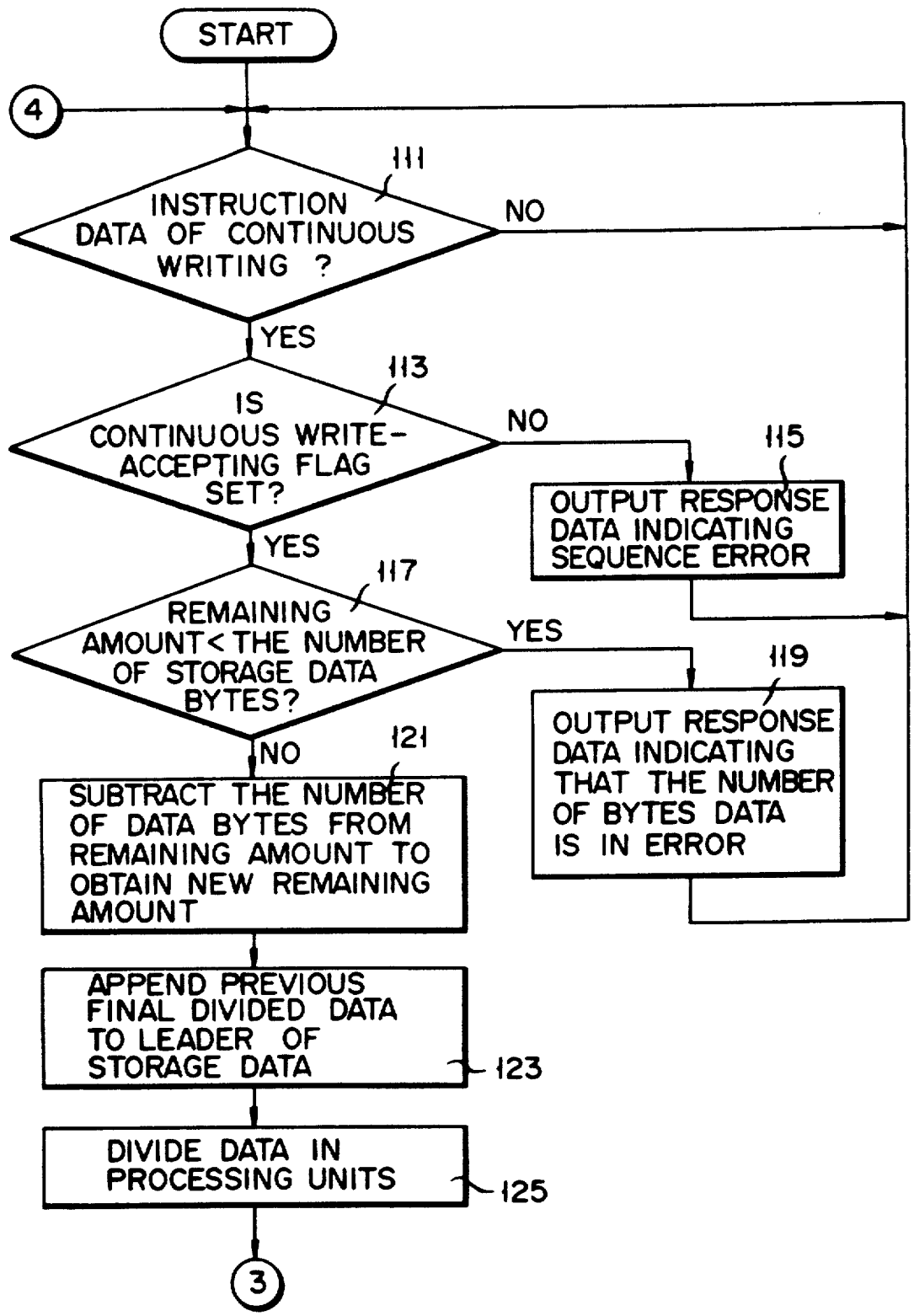
FIGS. 15A and 15B are flow charts for explaining a continuation write operation.
Figure 15B:
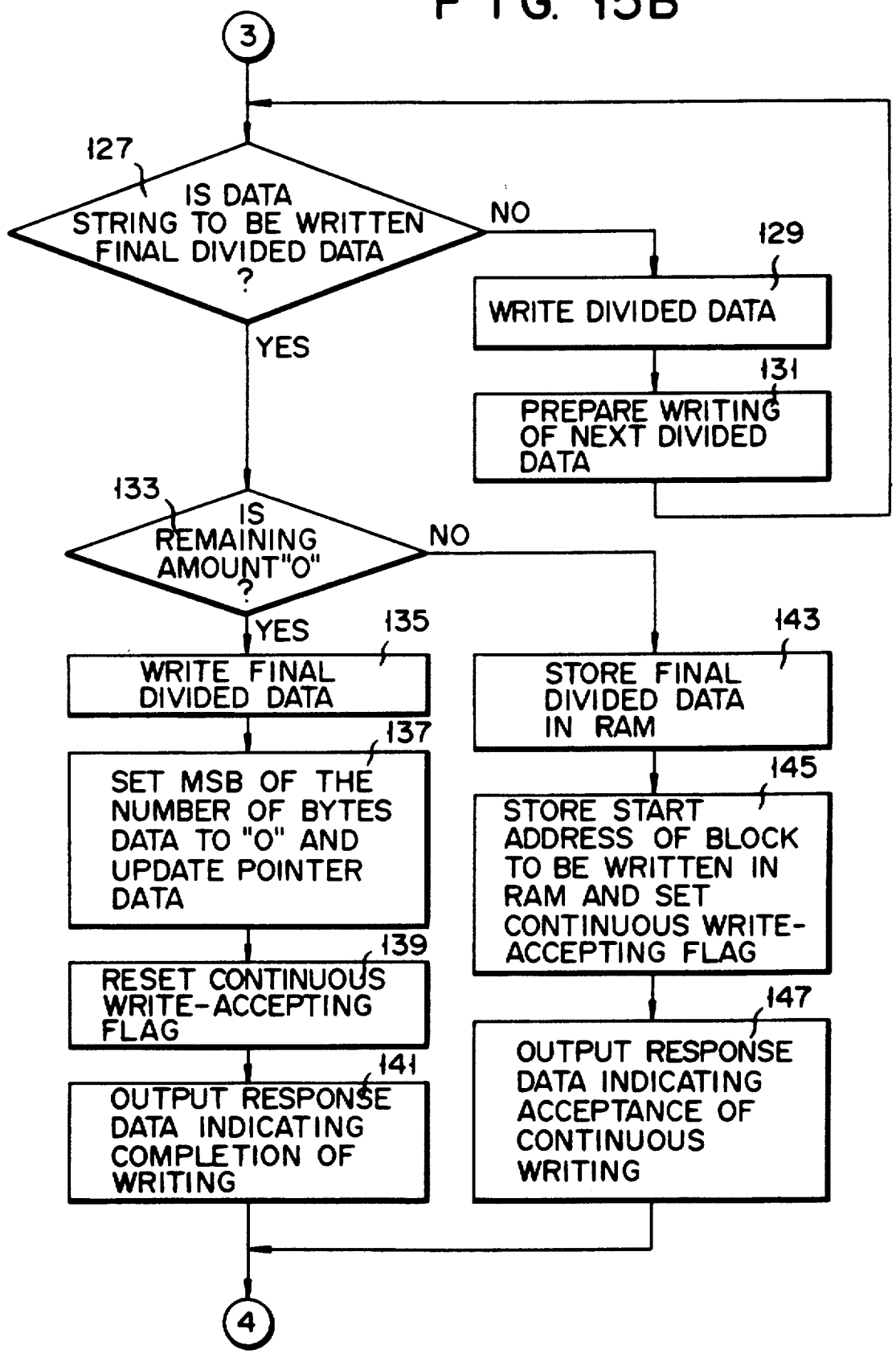

A continuation write operation will now be described with reference to the flow charts shown in FIGS. 15A and 15B. When the continuation write operation is performed, continuation write instruction data having a format shown in FIG. 16 is input. The continuation write instruction data consists of a continuation writing function code and storage data. If the continuation write instruction data is received in step 111, CPU 59 refers to the writing continuation accepting flag to check in step 113 if it is set. If NO in step 113, CPU 59 outputs response data indicating a sequence error in step 115, and awaits the next instruction data. However, if YES in step 113, CPU 59 compares the number of bytes of the input storage data with the remaining amount stored in RAM 60 in step 117. If the number of bytes is larger than the remaining amount, CPU 59 outputs response data indicating that the number of bytes data is in error in Step 119, and then awaits the next instruction data. Otherwise, CPU 59 subtracts the number of bytes from the remaining amount in step 121 and stores the difference as a new remaining amount.

CPU 59 appends previous final divided data to the leader of the input storage data to obtain new storage data in step 123, and divides it into processing units and adds attribute data to each processing unit in step 125. CPU 59 then stores the data in accordance with the write start address stored in RAM 60 (steps 127, 129, and 131). In this case, CPU 59 checks in step 127 if the data string to be written is final divided data. If YES in step 127, the flow advances to step 133. If YES in step 133, i.e., if the bit indicating the remaining amount is "0", all the storage data is stored, the MSB of the number of bytes data in the data string is set to "0", and the final address of the block including the final byte of the storage data string is stored as pointer data (steps 135 and 137). CPU 59 resets the writing continuation acceptance flag in step 139, outputs response data indicating completion of writing in step 141, and then awaits the next instruction data. However, if NO in step 133, CPU 159 stores the final divided data in RAM 60 without writing it in the specified area in step 143. In step 145, CPU 59 sets the writing continuation accepting flag, and stores the start address of the unwritten block in RAM 60 as a write start address. In step 147, CPU 59 outputs response data indicating writing continuation acceptance, and then awaits the next instruction data.

A data string which is too long to be stored by a single transmission can be stored as described above. When the data string is stored and units of blocks, in attribute data added thereto, bit "6" is set to "0" and bit "7" is set to "1". When the bit indicating the remaining amount is "0", in a block storing the final divided data, both bits "6" and "7" are set to "0".

Assume that instruction data shown in FIG. 17A is input. The instruction data shown in FIG. 17A is write instruction data, and a target area is [02]. The number of bytes of area [02] is four bytes, as shown in the index table of FIG. 11. First, the number of bytes data of the input instruction data is extracted, and pointer data located at the beginning of area [02] is referred to, thus checking if all the storage data can be stored. Thereafter, the MSB of the number of bytes data of the instruction data is set to "1" (FIG. 17B). Referring to FIG. 17B, "80" and "0B" are expressed in hexadecimal notation. The remaining amount is determined in accordance with the number of bytes from the index table and the number of bytes data in the instruction data (FIG. 17C). In this case, since the number of bytes data is "11" and the number of bytes set in the instruction data is "5", the remaining amount corresponds to "6". Five bytes are divided with the number of bytes of the processing unit (FIG. 17D), and are stored in area [02], as shown in FIG. 17E. Since the remaining amount is not "0", the final divided data is not stored. Then, the next write address is stored, and the writing continuation acceptance flag incorporated in data memory 61 is set.

Figure 17H:
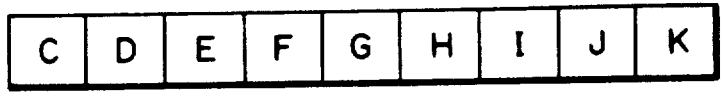
Figure 17I:
Figure 17J:
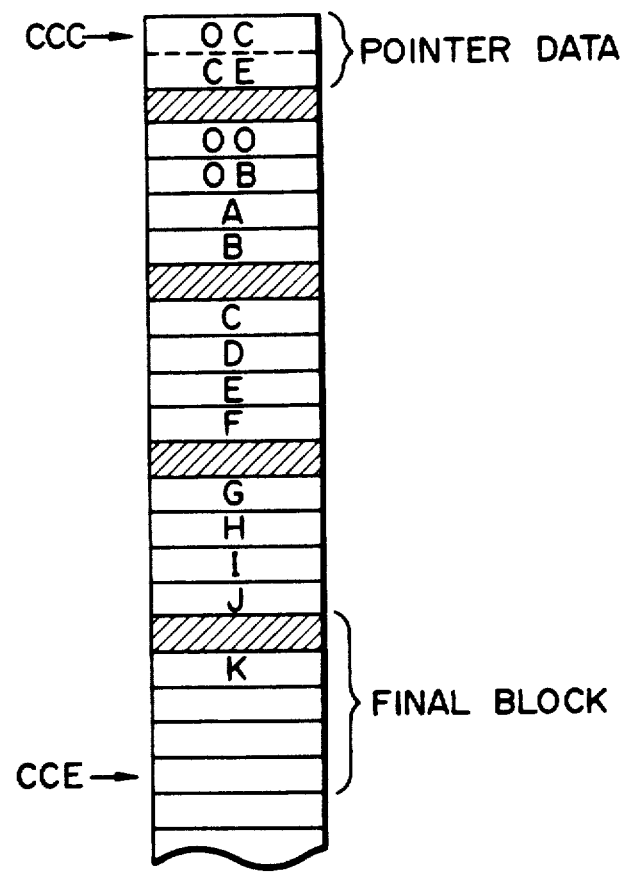

In this state, if the continuation write instruction data shown in FIG. 17F is input, the number of bytes in the instruction data is checked. A new remaining amount is set in accordance with the previous remaining amount and the number of bytes of the input storage data (FIG. 17G). In this case, since the previous remaining amount corresponds to "6" and the number of bytes of the input storage data corresponds to "6", the new remaining amount corresponds to "0". The previously stored final divided data and the input storage data are combined (FIG. 17H), the storage data is divided with the number of bytes of the processing unit (FIG. 17I), and is stored at the corresponding addresses of area [02] (FIG. 17J). In this case, since the remaining amount corresponds to "0", the MSB of the number of bytes data is set to "0", and the final address is stored as pointer data.

Figure 18A:
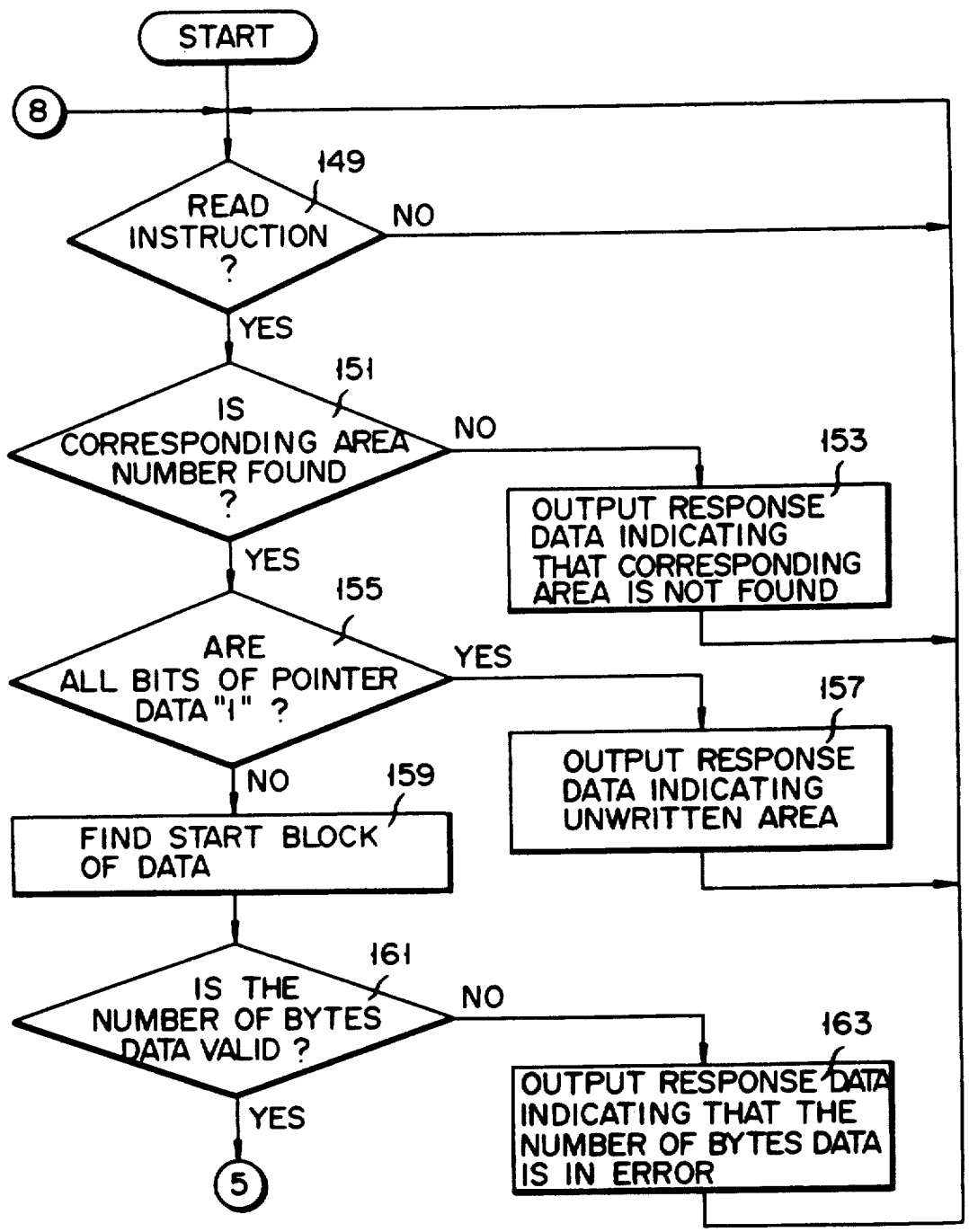
Figure 18C:
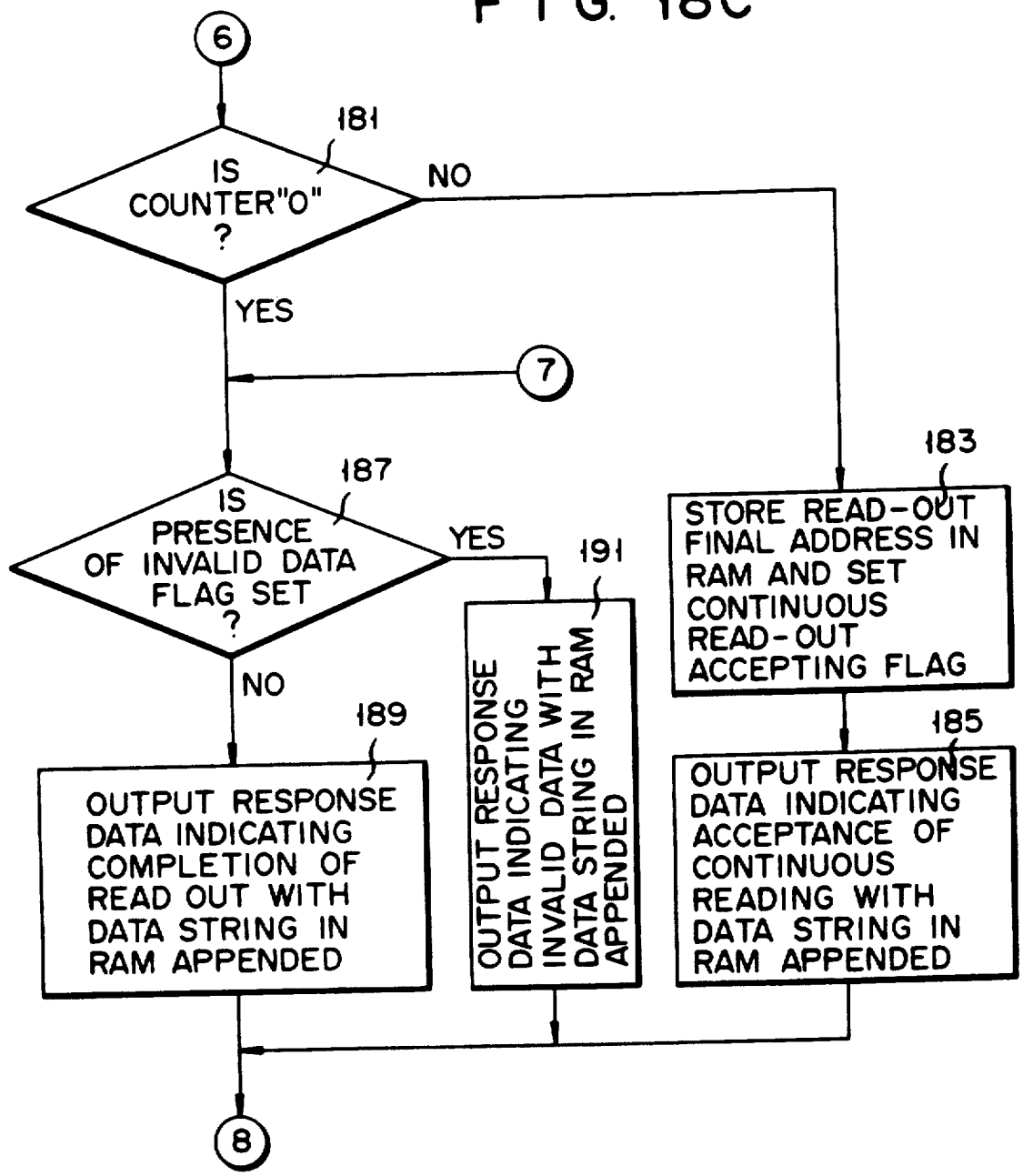
Figure 19:
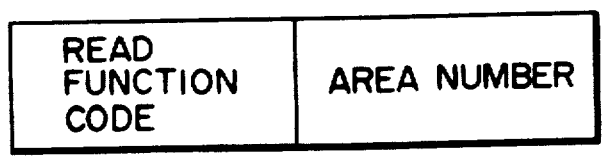
FIG. 19 is a format of read instruction data.

The data read operation from data memory 61 will be described with reference to the flow charts shown in FIGS. 18A through 18C. When data stored in data memory 61 is read out, read instruction data having a format shown in FIG. 19 is input. The read instruction data consists of a read function code and an area number. In a normal state, CPU 59 awaits instruction data from card reader/writer 11. When the instruction data from reader/writer 11 is input, CPU 59 checks in step 149 if the function code included in the input instruction data is a read function code. If YES in step 149, CPU 59 finds the area number in the instruction data from area [00] of data memory 61 in step 151. If NO in step 151, CPU 59 outputs response data indicating that the corresponding area is not found in step 153, and then awaits the next instruction data. If YES in step 151, CPU 59 refers to the number of processing bytes corresponding to the detected area, and stores the start and final addresses of the corresponding area in data memory 61. When data in the area is read out, CPU 59 refers to pointer data located at the beginning of the area to check in step 155 if all the bits of the pointer data are "1". When CPU 59 certifies that no data is stored in this area, it outputs response data indicating an unwritten area in step 157, and then awaits the next instruction data. However, if NO in step 155, i.e., if all the bits of the pointer data are not "1", CPU 59 finds the start block in the area based on the pointer data in step 159. Since the start block stores the number of bytes data, CPU 59 extracts the number of bytes data in step 161 to check if the target data string can be present in the area. For example, if the number of bytes data written in the start block is larger than a storage capacity calculated from the start and final address of the index table, this results in an error. As a result, if an error is detected, CPU 59 outputs response data indicating the number of bytes data is in error in step 163, and then awaits the next instruction data. However, if YES in step 161, i.e., if the number of bytes data is valid, CPU 59 sets the extracted number of bytes data as an initial value of a software counter stored in RAM 60. At this time, if it is judged in step 165 that the MSB of the number of bytes data is "1", CPU 59 certifies that the subsequent data string is invalid data, and sets the presence-of-invalid-data flag in step 167. CPU 59 then reads out the data string after the number of bytes data, byte by byte, and stores them in RAM 60. In this case, the software counter is decremented by one each time one-byte data is read out. However, when attribute data is read out, the software counter is not updated, and the attribute data is not stored in RAM 60.

The storage data is stored in RAM 60 until the content of the software counter reaches "0" (steps 169, 171, 173, 175, 177, and 179). However, since RAM 60 has a limited capacity, if the number of data has reached the capacity before the content of the software counter reaches "0" (step 181), CPU 59 stores the current content of the software counter and the final address of the data to be read out currently and, at the same time, sets a read-out continuation acceptance flag in RAM 60 in step 183. CPU 59 outputs response data indicating read continuation acceptance together with the data string stored in RAM 60 in step 185, and then awaits the next instruction data. If the content of the software counter has reached "0" (step 181), CPU 59 checks in step 187 if the presence-of-invalid-data flag is set. If NO in step 187, CPU 59 outputs response data together with the data string stored in RAM 60 in step 189, and then awaits the next instruction data. If YES in step 187, CPU 59 outputs response data indicating invalid data with the data string stored in RAM 60 in step 191, and then awaits the next instruction data.

Figure 20B:
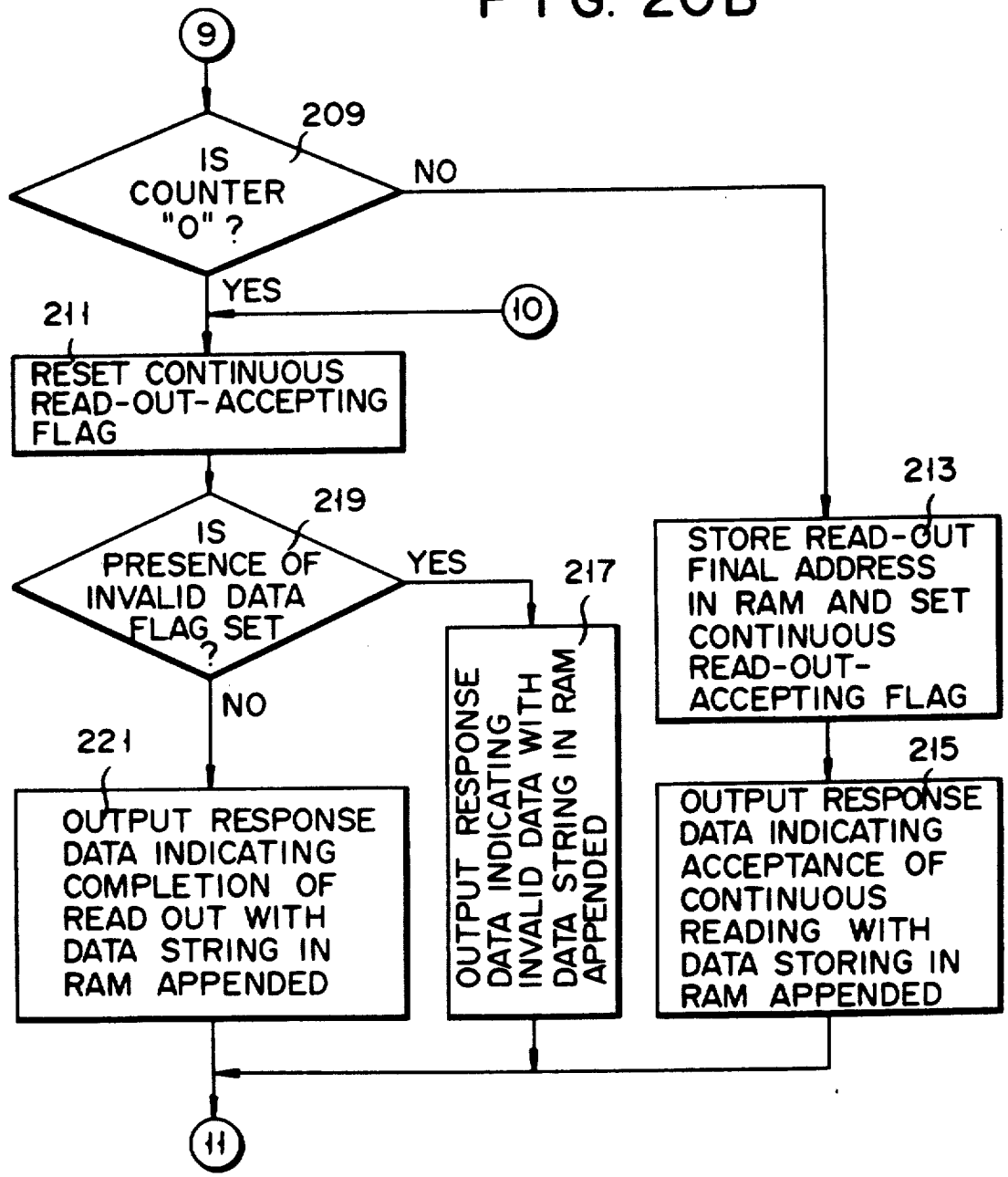
Figure 20C:
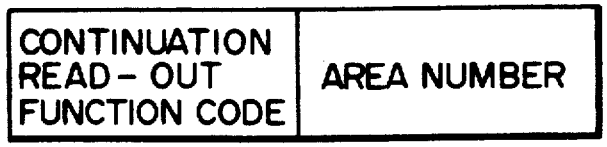
FIG. 20C is a view showing an example of a continuation read-out instruction data format.

A continuation read operation will now be described with reference to the flow chart shown in FIGS. 20A and 20B. When the continuation read operation is performed, continuation read-out instruction data having a format shown in FIG. 20C is input. The continuation read-out instruction data consists of a continuation read-out function code and an area number. If the continuation read-out instruction data is received in step 193, CPU 59 first refers to a read-out continuation acceptance flag to check in step 195 if it is set. If NO in step 195, CPU 59 outputs response data indicating a sequence error in step 197, and then awaits the next instruction data. If YES in step 195, CPU 59 reads out data, byte by byte, in accordance with the previously stored address while decrementing the software counter by one, and stores the data in RAM 60 (steps 199, 201, and 203). However, when the attribute data is read out, the software counter is not updated, and the attribute data is not stored in RAM 60. If the content of the software counter has reached "0" in step 207, CPU 59 resets the read-out continuation acceptance flag in step 211, and checks in step 219 if the presence-of-invalid-data flag is set. If NO in step 219, CPU 59 outputs response data indicating completion of read-out, together with the data string held in RAM 60 in step 221, and then awaits the next instruction data. If YES in step 219, CPU 59 outputs response data indicating invalid data, together with the data string held in RAM 60 in step 217, and then awaits the next instruction data. If the capacity of RAM 60 is full before the content of software counter reaches "0" in steps 205 and 209, CPU 59 stores the content of the counter and the final address of the current data read-out operation and, at the same time, sets the read-out continuation acceptance flag in step 213. CPU 59 thereafter outputs response data indicating read-out continuation acception, together with the data string in RAM 60 in step 215, and then awaits the next instruction data.

More specifically, assume that the read-out operation is performed in response to the read-out instruction data shown in FIG. 21A, with respect to an area shown in FIG. 17J (e.g., area [02]). Note that the capacity of RAM 60 is eight bytes. In this case, a data string read out by this instruction data is a data string, as shown in FIG. 21B, and the number of bytes data indicates 11 bytes. Therefore, when the readout data string is stored in RAM 60, the content of the software counter corresponds to "5". Since the content of the counter is not "0", response data indicating read-out continuation acceptance is output together with the data string (FIG. 21C). When the continuation read-out instruction data shown in FIG. 21D is then received, the data string shown in FIG. 21E is stored in RAM 60. At this time, since the content of the counter corresponds to "0", response data indicating completion of read-out is output together with the data string (FIG. 21F).

Figure 22:
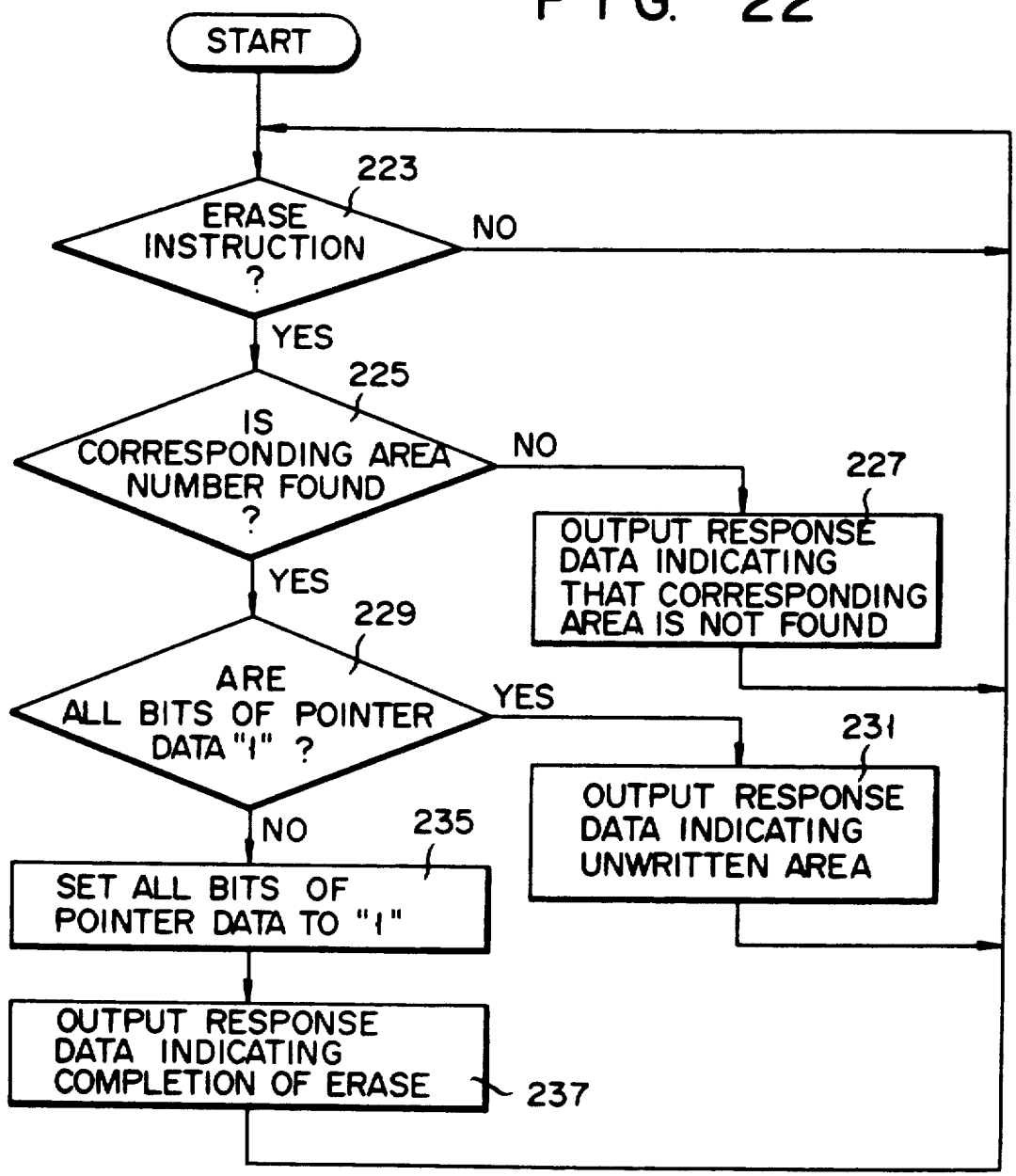
FIG. 22 is a flow chart for explaining a data erase operation.
Figure 23:
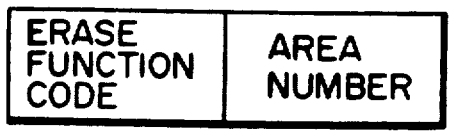
FIG. 23 is a format of erase instruction data.

A data erase operation from data memory 61 will be described with reference to the flow chart shown in FIG. 22. When data stored in data memory 61 is erased, erase instruction data having a format shown in FIG. 23 is input. The erase instruction data consists of an erase function code and an area number. In a normal state, CPU 59 awaits instruction data from card reader/writer 11. When instruction data is input from card reader/writer 11 at this time, CPU 59 checks in step 223 if the function code included in the instruction data is an erase function code. If YES in step 223, CPU 59 searches the area number included in the instruction data from area [00] of data memory 61 in step 225. If NO in step 225, CPU 59 outputs response data indicating that the corresponding area is not found in step 227, and then awaits the next instruction data. If YES in step 225, CPU 59 refers to the start address of the corresponding area to check pointer data therein in step 229. As a result, if all the bits of the pointer data are "1", CPU 59 determines that no data is stored in this area, outputs response data indicating an unwritten area in step 231, and then awaits the next instruction data. However, if all the bits of the pointer data are not "1", CPU 59 sets the all the bits of the pointer data to "1", in step 235 outputs response data indicating completion of the erase operation in step 237, and then awaits the next instruction data.

In the IC card described above, an area for storing the address (pointer data) of the final byte of the final block of written data while updating it is provided at the beginning of each data area in the data memory, and subsequent data access is made in accordance with the pointer data stored in this area. For example, when data is written in a target data area, the final address of a written data string need not be searched from the target area unlike the conventional IC card, thus greatly improving data access speed. In addition, data for certifying unwritten data need not be held, unlike the conventional IC card. Data management can be reliably performed even if a method different from a conventional data control method is adopted, thus allowing efficient use as an IC card system.

In the above embodiment, the control element, the data memory, and the program memory are constituted by a single IC chip. However, they need not be constituted by a single IC chip, but can be constituted by separate IC chips.

In the above embodiment, the IC card has been exemplified as a portable electronic device. However, the shape of the portable electronic device is not limited to a card-like shape, but can be a block-like shape or a pencil-like shape. The hardware arrangement of the portable electronic device can be modified within the spirit and scope of the invention.

What is claimed is:

1. A portable electronic device having a contactor electronically connecting a host system, comprising:
   first memory means, having memory locations, for sequentially storing a sequence of data, including current data and next data following the current data in the sequence of data, from the host system at memory locations of the first memory means;
   second memory means for storing position data representing a memory location of said first memory means;
   first determining means for determining whether or not data supplied from said host system is a write instruction for said first memory means;
   means for writing the current data in an unwritten memory location of said first memory means when said first determining means determines the write instruction is supplied from the host system;
   second determining means for determining whether or not a next unwritten memory location of said first memory means exists when said determining means determines the write instruction is supplied from the host system;
   means for storing in said second memory means position data representing a location in said first memory means at which the next data to be stored in the sequence of stored data is to be stored when said second determining means determines that the next unwritten memory location exists;
   means for outputting, after storing the position data in the second memory means, message data indicating that the next unwritten memory location exists; and
   means for outputting message data indicating that the next unwritten memory location does not exist when said second determining means determines that the next unwritten memory location does not exist.

2. The device according to claim 1, wherein said writing means writes the next data in an unwritten area of said first memory means upon receipt of a data-write access instruction from said host system.

* * * * *